US006614517B1

(12) United States Patent
Aubuchon et al.

(10) Patent No.: US 6,614,517 B1
(45) Date of Patent: Sep. 2, 2003

(54) METHOD AND COMPUTER AIDED APPARATUS FOR ALIGNING LARGE DENSITY FIBER ARRAYS

(75) Inventors: Christopher Aubuchon, Palo Alto, CA (US); Sascha Hallstein, Los Gatos, CA (US)

(73) Assignee: Nayna Networks, Inc., Milpitas, CA (US)

( * ) Notice: Subject to any disclaimer, the term of this patent is extended or adjusted under 35 U.S.C. 154(b) by 0 days.

(21) Appl. No.: 09/956,261

(22) Filed: Sep. 18, 2001

(51) Int. Cl.$^7$ ................................................ G01B 9/00
(52) U.S. Cl. .......................... 356/124; 385/16; 700/95
(58) Field of Search ............... 385/15–26; 700/95–212; 356/73.1, 364, 365, 124–127; 430/30

(56) References Cited

U.S. PATENT DOCUMENTS

| | | | |
|---|---|---|---|
| 4,317,611 A | | 3/1982 | Petersen |
| 4,763,272 A | * | 8/1988 | McLandrich ................ 364/468 |
| 4,836,636 A | * | 6/1989 | Obara ....................... 350/96.2 |
| 4,942,766 A | | 7/1990 | Greenwood et al. |
| 5,488,862 A | | 2/1996 | Neukermans et al. |
| 5,629,790 A | | 5/1997 | Neukermans et al. |
| 5,648,618 A | | 7/1997 | Neukermans et al. |
| 5,658,710 A | | 8/1997 | Neukermans |
| 5,675,495 A | * | 10/1997 | Biermann et al. ..... 364/468.03 |
| 5,841,553 A | | 11/1998 | Neukermans et al. |
| 5,861,549 A | | 1/1999 | Neukermans et al. |
| 5,907,650 A | * | 5/1999 | Sherman et al. ............... 385/80 |
| 5,969,465 A | | 10/1999 | Neukermans et al. |
| 6,044,705 A | | 4/2000 | Neukermans et al. |
| 6,064,779 A | | 5/2000 | Neukermans et al. |
| 6,120,950 A | * | 9/2000 | Yasuyuki ..................... 430/30 |
| 6,188,472 B1 | * | 2/2001 | Gage et al. ................ 356/73.1 |
| 6,307,617 B1 | * | 10/2001 | Nishiki et al. ................ 355/53 |
| 6,411,384 B2 | * | 6/2002 | Sakuma et al. ............. 356/365 |

* cited by examiner

*Primary Examiner*—Hoa Q. Pham
*Assistant Examiner*—Willie Davis
(74) *Attorney, Agent, or Firm*—Townsend and Townsend and Crew LLP

(57) ABSTRACT

A method (and system) for manufacturing an optical switching device. The method includes forming an array plate comprising at least one hundred sites from a first physical process, where each of the sites is for coupling to an optical fiber. The sites have a first spatial degree of error relative to an ideal mathematical grid of the sites. The first spatial degree of error is derived from at least the first physical process. The method forms a lens plate comprising a plurality of lenses from a second physical process. Each of the lenses is going to be coupled to at least one of the sites on the array plate. The lenses have a second spatial degree of error relative to a second mathematical grid of lenses. The second spatial degree of error is derived from at least the second physical process. The method then derives lens measurement values from each of the plurality of lenses. The method compares each of the site measurement values with its respective lens measurement value to determine an error measurement between the lens measurement values and the respective site measurement values at a first reference point. The method then shifts the site measurement values relative to the lens measurement values by a selected increment relative to the first reference point. The selected increment is an x-direction, a y-direction, or a theta direction, or any combination of these. The method repeats the comparing to derive an other error measurement after the site measurement values have been shifted and continuing to perform the comparing and shifting in an iterative manner to reduce and/or possibly minimize the error measurement between the site measurement values with its respective lens measurement values.

10 Claims, 7 Drawing Sheets

- Nominal values
- Measured values

METHOD AND COMPUTER AIDED APPARATUS FOR ALIGNING LARGE DENSITY FIBER ARRAYS

BACKGROUND OF THE INVENTION

This invention generally relates to techniques for fabricating integrated objects. More particularly, the present invention provides a method and resulting structure for manufacturing a lens array structure onto a fiber array, where the lens array and fiber array are used for interfacing to an optical switching device. Merely by way of example, the present invention is implemented using such lens array and fiber array in a switching system for long haul communications, but it would be recognized that the invention has a much broader range of applicability. The invention can be applied to other types of networks including local area networks, enterprise networks, small switch designs (e.g., two by two) and the like.

As the need for faster communication networks becomes more desirable, digital telephone has progressed. Conventionally, analog voice telephone signals have been converted into digital signals. These signals can be 24,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode fiber optics have also been used at much higher speeds of data transfer. Here, optical switching networks have also been improved. An example of such optical switching standard is called the Synchronous Optical Network (SONET), which is a packet switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices require the need to convert optical signals from a first source into electric signals for switching such optical signals over a communication network. Once the electric signals have been switched, they are converted back into optical signals for transmission over the network. There are many examples of such conventional switch systems, such as those made by Sycamore Networks, Inc., Lucent Technologies, Inc. and others. Numerous limitations exist with such conventional electrical switching technique. For example, such electrical switching often requires a lot of complex electronic devices, which make the device difficult to scale. Additionally, such electronic devices become prone to failure, thereby influencing a reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale for switching a high number of signals from a bundle of optical fibers, which may be desirable today. Other companies have also been attempting to develop technologies for switching such high number of signals, but have generally been limited. Such switches are also difficult to manufacture effectively and reliably, where even connecting the fiber bundle to the system proves to be quite challenging.

As merely an example, some companies have been attempting to form such connection of the fiber bundle to the system using an array of tapered fiber structures. Tapered fibers are often difficult to make with high accuracy and often cannot be scaled up to form large numbered array configurations. U.S. Pat. No. 5,907,650, assigned to Fiber Guide Industries, Inc, describes a conventional way of making a tapered fiber for use of an array. As noted, such tapered fibers are often difficult to make accurately. Additionally, the tapered fibers generally require a substrate structure with accurate sized openings, which are also extremely difficult to make accurately. That is, it is difficult to define center-to-center accuracy between each of the openings to a high degree. Additionally, it is often difficult to form an opening that is controllable and houses the tapered fiber in an accurate manner. These and other limitations limit the practical use of such tapered fibers for large numbered array configurations.

From the above, it is seen that an improved way for fabricating an object for the manufacture of fiber optical devices is highly desirable.

SUMMARY OF THE INVENTION

According to the present invention, a technique including a method and device for manufacturing an integrated object is provided. More particularly, the present invention provides a method and resulting structure for manufacturing a lens array structure onto a fiber array, where the lens array and fiber array are used for interfacing to an optical switching device. Merely by way of example, the present invention is implemented using such lens array and fiber array in a switching system for long haul communications, but it would be recognized that the invention has a much broader range of applicability. The invention can be applied to other types of networks including local area networks, enterprise networks, small switch designs (e.g., two by two) and the like.

In a specific embodiment, the invention provides a method for manufacturing an optical switching device. The method includes forming an array plate comprising at least one hundred sites from a first physical process, where each of the sites is for coupling to an optical fiber. The sites have a first spatial degree of error relative to an ideal mathematical grid of the sites. The first spatial degree of error is derived from at least the first physical process. The method also derives site measurement values from each of the sites and transfers site measurement values for each of the sites into a memory location. The method forms a lens plate comprising a plurality of lenses from a second physical process. Each of the lenses is going to be coupled to at least one of the sites on the array plate. The lenses have a second spatial degree of error relative to a second mathematical grid of lenses. The second spatial degree of error is derived from at least the second physical process. The method then derives lens measurement values from each of the plurality of lenses and transfers the lens measurement values for each of the sites into the memory location. The method compares each of the site measurement values with its respective lens measurement value to determine an error measurement between the lens measurement values and the respective site measurement values at a first reference point. The method then shifts the site measurement values relative to the lens measurement values by a selected increment relative to the first reference point. The selected increment is an x-direction, a y-direction, or a theta direction, or any combination of these. The method repeats the comparing to derive an other error measurement after the site measurement values have been shifted and continuing to perform the comparing and shifting in an iterative manner to reduce and/or possibly minimize the error measurement between the site measurement values with its respective lens measurement values. The method determines a reduced or possibly a minimum error measurement based upon the repeated comparing and shifting. The minimum error measurement is relative to the first reference point. The method couples the array plate with the plurality of lenses by aligning the array plate to the plurality of lenses such that the site measurement values and the lens measurement values are arranged in a manner where the error measurement is at the reduced and/or minimum error measurement.

Many benefits are achieved by way of the present invention over conventional techniques. In a specific embodiment, the invention provides an improved way of aligning a high number lens array (e.g., 250, 1000, or more) to a fiber bundle array in an efficient and accurate manner. Additionally, the invention can be implemented using conventional lens arrays, which have process inaccuracies. The invention can also be implemented using conventional high speed computing devices, if desired. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including a method and device for manufacturing an integrated object is provided. More particularly, the present invention provides a method and resulting structure for manufacturing a lens array structure onto a fiber array, where the lens array and fiber array are used for interfacing to an optical switching device. Merely by way of example, the present invention is implemented using such lens array and fiber array in a switching system for long haul communications, but it would be recognized that the invention has a much broader range of applicability. The invention can be applied to other types of networks including local area networks, enterprise networks, small switch designs (e.g., two by two) and the like.

Figure 1:
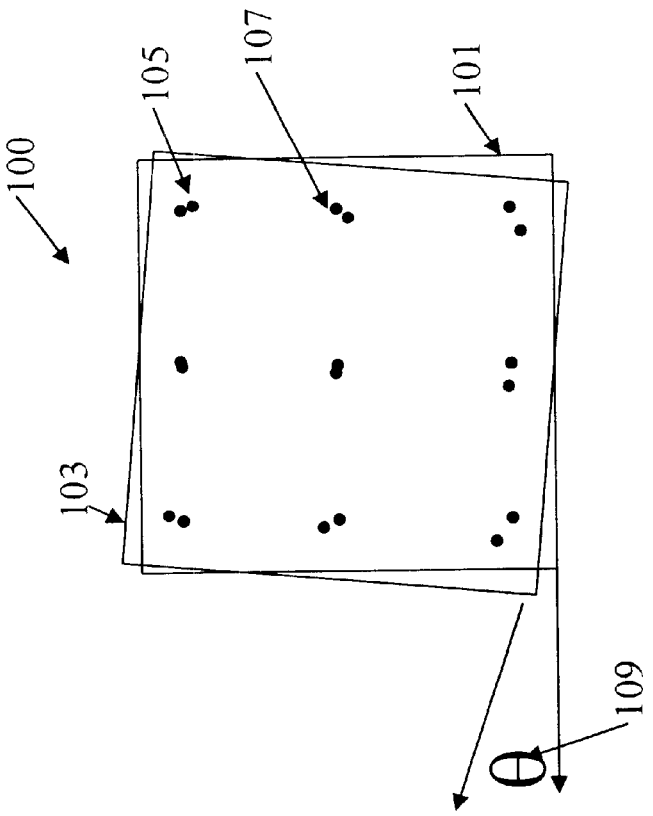
FIG. 1 is a simplified diagram of fiber bundle plates according to an embodiment of the present invention.

FIG. 1 is a simplified diagram of fiber bundle plates 100 according to an embodiment of the present invention. This diagram is merely an example that should not unduly limit the invention defined by the scope of the claims herein. One of ordinary skill in the art would recognize many other variations, modifications, and alternatives. As shown, the fiber bundle plates include a first plate 101 and a second plate 103, which are coupled to each other. Plate 101 includes sites 107, which are arranged in a spatial manner to form an array. Each site will include a fiber for transmission of an optical signal. Plate 103 also includes sites 105, which are arranged in a spatial manner to form an array. Plate 101 should be mated with plate 103 and each of the sites should be respectively aligned to each other in an- ideal mathematical grid formation. Conventional sites, however, are often made using conventional tools and processes, which have some inherent error. Accordingly, the sites do not align with each other according to the ideal mathematical grid formation. Details of such non-ideal alignment are illustrated more fully below.

Figure 2:
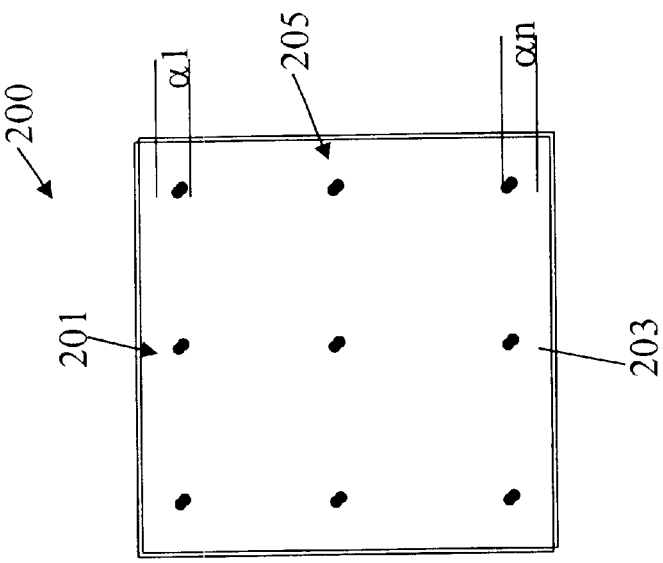
FIG. 2 is a simplified diagram of fiber bundle plates according to an embodiment of the present invention.

FIG. 2 is a simplified diagram of fiber bundle plates 200 according to an embodiment of the present invention. This diagram is merely an example that should not unduly limit the invention defined by the scope of the claims herein. One of ordinary skill in the art would recognize many other variations, modifications, and alternatives. As shown, the two plates are stacked on top of each other. The sites from the top plate are respectively aligned with the bottom plate. Each pair of sites 201, 203, 205 includes an alignment error $\alpha 1$. The alignment errors ($\alpha 2$, $\alpha 3$, $\alpha n$) also exist for the other sites. According to the present invention, we have discovered a method and system to reduce or possibly minimize the amount of alignment errors between each pair of sites. Details of such method and system are provided throughout the present specification and more particularly below.

A method according to an embodiment of the present invention can be outlined as follows:

1. Provide spatial coordinate data from component 1 (e.g., fiber bundle array);
2. Provide spatial coordinate data from component 2 (e.g., lens array);
3. Overlay spatial coordinate data from component 1 with spatial coordinate data from component 2;
4. Reduce or possibly optimize error between the coordinates from component 1 and component 2;
5. Adjust global position of data from component 1 with the data from component 2 for spatial directions including theta, shift x, and shift y, and optionally shift z;
6. Calculate error between the coordinates from component 1 and component 2;
7. Repeat the above steps to reduce or possibly optimize the error between the coordinates from the first and second components;
8. Calculate final coordinates to overlap each of the components;
9. Dispose first component with second component according to the final coordinates;
10. Bond first component to second component at the final coordinates; and
11. Perform other steps, as desired.

The above sequence of steps is used to reduce or possibly optimize reduced errors. Such errors are between spatial positions of a first component and spatial positions of a second component. Each of the components includes a plurality of spatial sites, which should match up with the other component in a spatial manner. Preferably, each of the components has spatial sites, which form an array in a perfect mathematical configuration. Unfortunately, real life manufacturing tolerances often cause deviations of such perfect mathematical configuration, which are improved at least in part by way of the present method. These and other details of this method are provided below according to the figure.

Figure 3:
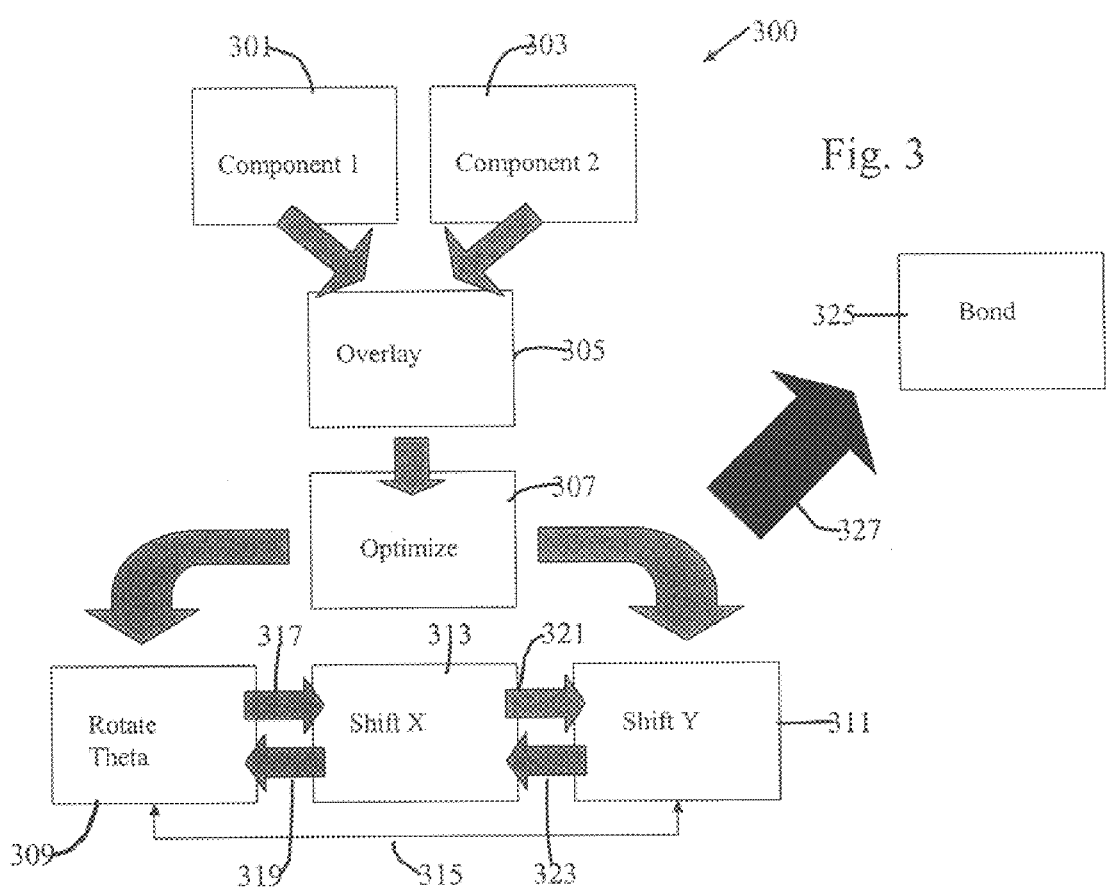
FIG. 3 is a simplified diagram illustrating a method according to an embodiment of the present invention.

FIG. 3 is a simplified diagram illustrating a method 300 according to an embodiment of the present invention. This diagram is merely an example that should not unduly limit the invention defined by the scope of the claims herein. One of ordinary skill in the art would recognize many other variations, modifications, and alternatives. As shown, the method includes a step of providing (step 301) spatial coordinate data from component 1 (e.g., fiber bundle array). The spatial coordinate data includes, for example, x-y data for each of the spatial positions on the component. In a specific embodiment, the positions form an array structure. The array structure has a large number of sites. Such sites are numbered by more than 16 sites or more than 25 sites or more than 36 sites or more than 100 sites or more than 144 sites or more than 1024 sites, depending upon the application. The sites are often made using a conventional manufacturing process, which is prone to error and process design limitations. Accordingly, the sites do not form a perfect mathematical grid, but rather forms an almost perfect grid configuration.

The method also provides (step 303) spatial coordinate data from component 2 (e.g., lens array). The spatial coordinate data includes, for example, x-y data for each of the spatial positions on the component. In a specific embodiment, the positions form an array structure. The array structure has a large number of sites. Such sites are numbered by more than 16 sites or more than 25 sites or more than 36 sites or more than 100 sites or more than 144 sites or more than 1024 sites, depending upon the application. The sites are often made using a conventional manufacturing process, which is prone to error and process design limitations. Accordingly, the sites do not form a perfect mathematical grid, but rather forms an almost perfect grid configuration.

The two components that have almost perfect grid formations are coupled to each other in a way to reduce the amount of error between each of the components. Preferably, the sites from the first component match up exactly with the sites from the second component. Unfortunately, since there are errors and process design limitations for each of the components, a total alignment error between each of the components is preferably reduced by way of the present method. The method uses the data from each of the components and overlays (step 305) them against each other to calculate a global error between each of the components. The error is calculated using any conventional error determination technique.

Next, the method performs an iterative process to reduce or possibly optimize (step 307) error between the coordinates from component 1 and component 2. The method adjusts global position of data from component 1 with the data from component 2 for spatial directions including theta (step 309), x (step 313), and y (step 311), and optionally z, which is normal to x, y, and theta. The method can perform these steps in almost any order but is preferably performed where component 1 is rotated in a predetermined manner and predetermined increment in a theta direction. The predetermined manner can be clockwise or counter clockwise. The increment can include a few degrees or less or one degree or less, depending upon the application. The error is calculated again to see if the error has been reduced. If not, component 1 is rotated back toward its original position relative to component 2 to a position that is half of the predetermined increment. The error is calculated again to see if the error has been reduced. If so, the method continues to the next step (step 317).

The method then shifts the components relative to each other in the x-direction (step 313) in a predetermined manner and predetermined increment. The predetermined manner can be in a positive direction or negative direction. The increment can include hundreds of micrometers (e.g., 100 micron, 200 micron) or less, depending upon the application. The error is calculated again to see if the error has been reduced. If not, component 1 is moved back toward its original position relative to component 2 to a position that is half of the predetermined increment. The error is calculated again to see if the error has been reduced. If so, the method continues to the next step (step 321).

The method then shifts the components relative to each other in the y-direction (step 311) in a predetermined manner and predetermined increment. The predetermined manner can be in a positive direction or negative direction. The increment can include any suitable amount. The error is calculated again to see if the error has been reduced. If not, component 1 is moved back toward its original position relative to component 2 to a position that is half of the predetermined increment. The error is calculated again to see if the error has been reduced. If so, the method continues to the next step (step 315), which can be step 309. Alternatively, the method continues along branches 323 and 319.

The method continues and repeats the above steps to reduce or possibly optimize the error between the coordinates from the first and second components. The reduced error is calculated using any conventional technique. Once the total error between each of the overlapping sites has been reduced or possibly minimized, the method calculates final coordinates (step 327) to overlap each of the components in a physical manner. The method disposes or couples the first component with second component according to the final coordinates, which are calculated using the method above. The first component is then bonded (step 325) to the second component at the final coordinates. The bonded components include reduced spatial error between each of the components according to an embodiment of the present invention.

The above figure describes aspects of the invention illustrated by elements in a simplified flow diagram. As will be understood by one of ordinary skill in the art, the elements can be implemented other ways. The method is preferably implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. These and other variations, modifications, and alternatives will be apparent by one of ordinary skill in the art.

Figure 4:
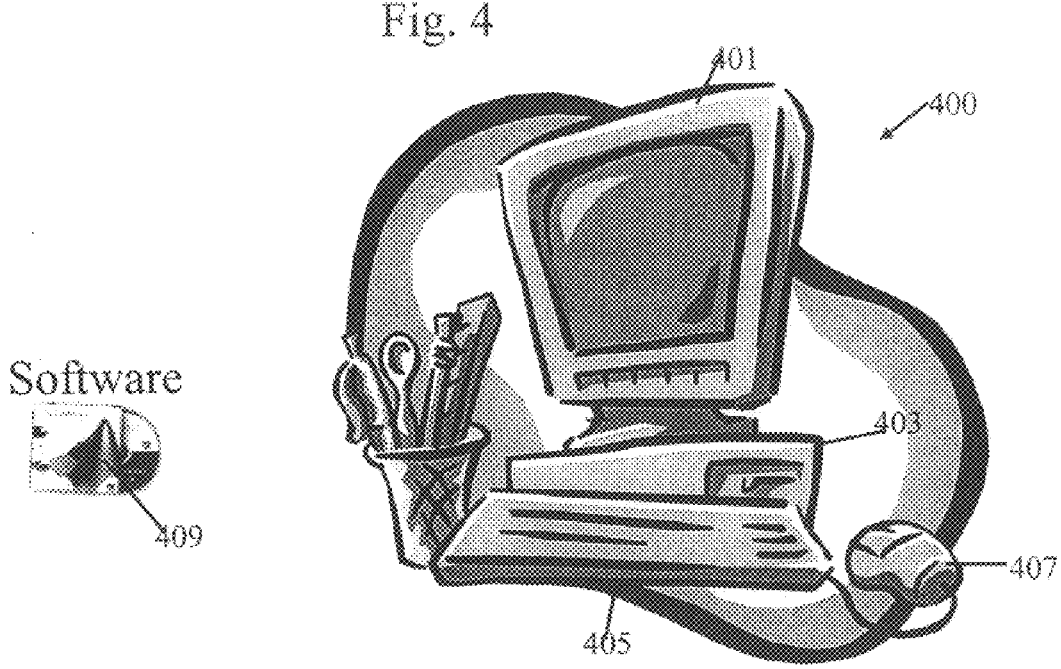
FIG. 4 is a simplified diagram of a computing system according to an embodiment of the present invention.

FIG. 4 is a simplified diagram of a computing system 400 according to an embodiment of the present invention. This diagram is merely an example that should not unduly limit the invention defined by the scope of the claims herein. One of ordinary skill in the art would recognize many other variations, modifications, and alternatives. As shown, the computing system 400 includes a variety of common elements such as a display 401, which can be a CRT or flat panel. The system also has an enclosure for housing boards, memory, microprocessors, power supply, and integrated circuits, which are basically a computer system. The computer can be any microprocessor based system such as a Pentium™ based system or the like. The computer has a processing speed of about 500 MHz and greater. The computer also has a keyboard 405 and mouse 407.

Additionally, the computing system includes computer software 409, which is programmed to carry out the inventions described herein. The computer software can be any program that is capable of performing the methods described herein. The program should have suitable characteristics. These characteristics include ease in programming, compiling, and execution. The system and software can be coupled to a mechanical alignment apparatus, which is used to manually align the plates together. Alternatively, the data from the mechanical plates can be manually gathered and inputted into the program. The program can include one called Matlab by Mathworks of Natick, Mass., but can also be others. Of course, the type of program used depends upon the application.

The above figures describe aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. These and other variations, modifications, and alternatives will be apparent by one of ordinary skill in the art. Further details of methods according to embodiments of the present invention can be found throughout the present specification and more particularly below.

A method according to an alternative embodiment of the present invention be outlined as follows:

1. Provide spatial coordinate data from component 1 (e.g., fiber bundle array);
2. Provide spatial coordinate data from component 2 (e.g., lens array);
3. Overlay spatial coordinate data from component 1 with spatial coordinate data from component 2;
4. Measure error between the coordinates from component 1 and component 2;
5. Adjust global position of data from component 1 with the data from component 2 for one of the spatial directions including theta, shift x, and shift y, and optionally shift z;
6. Re-calculate error between the coordinates from component 1 and component 2 for the selected spatial direction;
7. Repeat the above steps for the other spatial directions to reduce or possibly optimize the error between the coordinates from the first and second components;
8. Calculate final coordinates to overlap each of the components;
9. Dispose first component with second component according to the final coordinates;
10. Bond first component to second component at the final coordinates; and
11. Perform other steps, as desired.

The above sequence of steps is used to reduce or possibly optimize errors. Such errors are between spatial positions of a first component and spatial positions of a second component. Each of the components includes a plurality of spatial sites, which should match up with the other component in a spatial manner. Preferably, each of the components has spatial sites, which form an array in a perfect mathematical configuration. Unfortunately, real life manufacturing tolerances often cause deviations of such perfect mathematical configuration, which are improved at least in part by way of the present method. These and other details of this method are provided below according to the figure.

Figure 5:
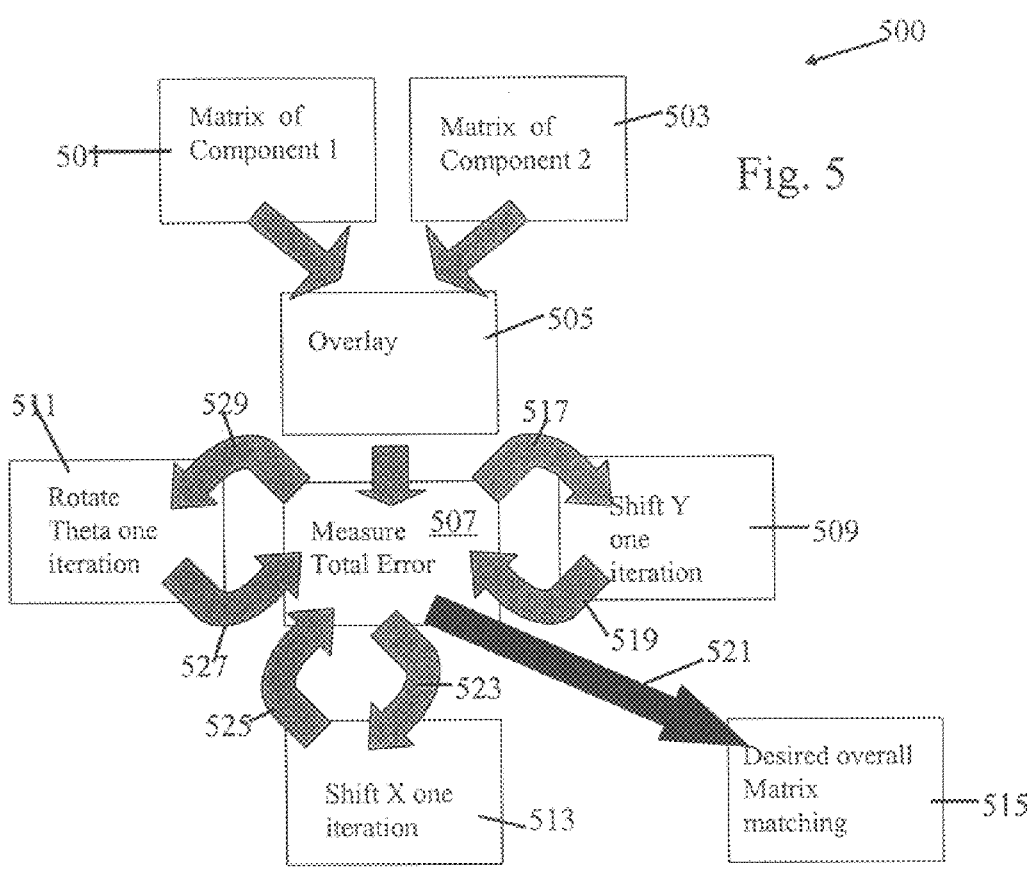
FIG. 5 is a simplified diagram illustrating a method according to an alternative embodiment of the present invention.

FIG. 5 is a simplified diagram 500 illustrating a method according to an alternative embodiment of the present invention. This diagram is merely an example that should not unduly limit the invention defined by the scope of the claims herein. One of ordinary skill in the art would recognize many other variations, modifications, and alternatives. As shown, the method includes a step of providing (step 501) spatial coordinate data from component 1 (e.g., fiber bundle array). The spatial coordinate data includes, for example, x-y data for each of the spatial positions on the component. In a specific embodiment, the positions form an array structure. The array structure has a large number of sites. Such sites are numbered by more than 16 sites or more than 25 sites or more than 36 sites or more than 100 sites or more than 144 sites or more than 1024 sites, depending upon the application. The sites are often made using a conventional manufacturing process, which is prone to error and process design limitations. Accordingly, the sites do not form a perfect mathematical grid, but rather forms an almost perfect grid configuration.

The method also provides (step 503) spatial coordinate data from component 2 (e.g., lens array). The spatial coordinate data includes, for example, x-y data for each of the spatial positions on the component. In a specific embodiment, the positions form an array structure. The array structure has a large number of sites. Such sites are numbered by more than 16 sites or more than 25 sites or more than 36 sites or more than 100 sites or more than 144 sites or more than 1024 sites, depending upon the application. The sites are often made using a conventional manufacturing process, which is prone to error and process design limitations. Accordingly, the sites do not form a perfect mathematical grid, but rather forms an almost perfect grid configuration.

The two components that have almost perfect grid formations are coupled to each other in a way to reduce the amount of error between each of the components. Preferably, the sites from the first component match up exactly with the sites from the second component. Unfortunately, since there are errors and process design limitations for each of the components, a total alignment error between each of the components is preferably reduced by way of the present method. The method uses the data from each of the components and overlays (step 505) them against each other to calculate a global error between each of the components. The error is calculated (step 507) using any conventional technique.

Next, the method performs an iterative process to reduce or possibly optimize the reduced error between the coordinates from component 1 and component 2.

The method adjusts global position of data from component 1 with the data from component 2 for one of the spatial directions including theta (step 511), x (step 513), and y (step 509). The method can perform these steps in almost any order but is preferably performed where component 1 is rotated in a predetermined manner and predetermined increment in a theta direction via branch 529. The predetermined manner can be clock wise or counter clockwise. The increment can include a few degrees or less or one degree or less, depending upon the application. The error is calculated again (step 507) via branch 527 to see if the error has been reduced. If not, component 1 is rotated back toward its original position relative to component 2 to a position that is half of the predetermined increment. The error is calculated again to see if the error has been reduced. If so, the method continues to the next step via branch 523.

The method then shifts the components relative to each other in the x-direction (step 513) in a predetermined manner and predetermined increment. The predetermined manner can be in a positive direction or negative direction. The increment can include any suitable measurement that is half of the amount of accuracy needed or less, depending upon the application. The error is calculated again to see if the error has been reduced. If not, component 1 is moved back toward its original position relative to component 2 to a position that is half of the predetermined increment. The error is calculated again (step 507) via branch 525 to see if the error has been reduced. If so, the method continues to the next step via branch 517.

The method then shifts the components relative to each other in the y-direction (step 509) in a predetermined manner and predetermined increment. The predetermined manner can be in a positive direction or negative direction. The increment can include any suitable measurement that is half of the amount of accuracy needed or less, depending upon the application. The error is calculated again (step 507) via branch 519 to see if the error has been reduced. If not, component 1 is moved back toward its original position relative to component 2 to a position that is half of the predetermined increment. The error is calculated again to see if the error has been reduced. If so, the method continues to the next step, which can be steps 509, 513, 511, and others.

The method continues and repeats the above steps to reduce or possibly optimize the error between the coordinates from the first and second components. The reduced error is calculated using any conventional technique. Once the total error between each of the overlapping sites has been reduced or possibly minimized, the method calculates final coordinates (step 515) to overlap each of the components in a physical manner via branch 521. The method disposes or couples the first component with second component according to the final coordinates, which are calculated using the method above. The first component is then bonded to the second component at the final coordinates. The bonded components include reduced spatial error between each of the components according to an embodiment of the present invention.

The above figure describes aspects of the invention illustrated by elements by a simplified flow diagram. As will be understood by one of ordinary skill in the art, the elements can be implemented other ways. The method is preferably implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. Additionally, the present method and system can be used to align other types of arrays to each other. Such arrays include fiber bundle array, lens array, mirror array, or any combination of these, and others. These and other variations, modifications, and alternatives will be apparent by one of ordinary skill in the art.

EXAMPLE

To prove the principle and operation of the present invention, we performed experiments. These experiments are merely examples and should not unduly limit the scope of the claims herein. One of ordinary skill in the art would recognize many other variations, modifications, and alternatives. In this experiment, we provided it to serve as instructional tool and process in mating a fiber-array to lens-array, which are often coupled to each other for networking applications. We made a hypothetical fiber-bundle ("FB") of a 3×3 (three by three) to a lens array of 3×3 (three by three). The fiber bundle and the lens array have ideal schematics, where the central fiber core and lens apex are of the same coordinates (we will call the schematics file "DXF", which is shown below.). The coordinates include X and Y. The 3×3 size has been selected for ease of showing and for illustration only. With data files of the FB and nominal DXF values corresponding to:

TABLE 1

Data Measured and Nominal Values

| Data File | | Nominal values | |
|---|---|---|---|
| 0.02900 | 0.07900 | 0 | 0 |
| −0.06600 | 1.05900 | 0 | 1 |
| 0.06000 | 1.95400 | 0 | 2 |
| 0.98600 | −0.03600 | 1 | 0 |
| 1.03000 | 1.00200 | 1 | 1 |
| 1.07900 | 2.04600 | 1 | 2 |
| 2.05200 | −0.06500 | 2 | 0 |
| 1.94100 | 0.95300 | 2 | 1 |
| 2.04900 | 2.01800 | 2 | 2 |

Figure 6:
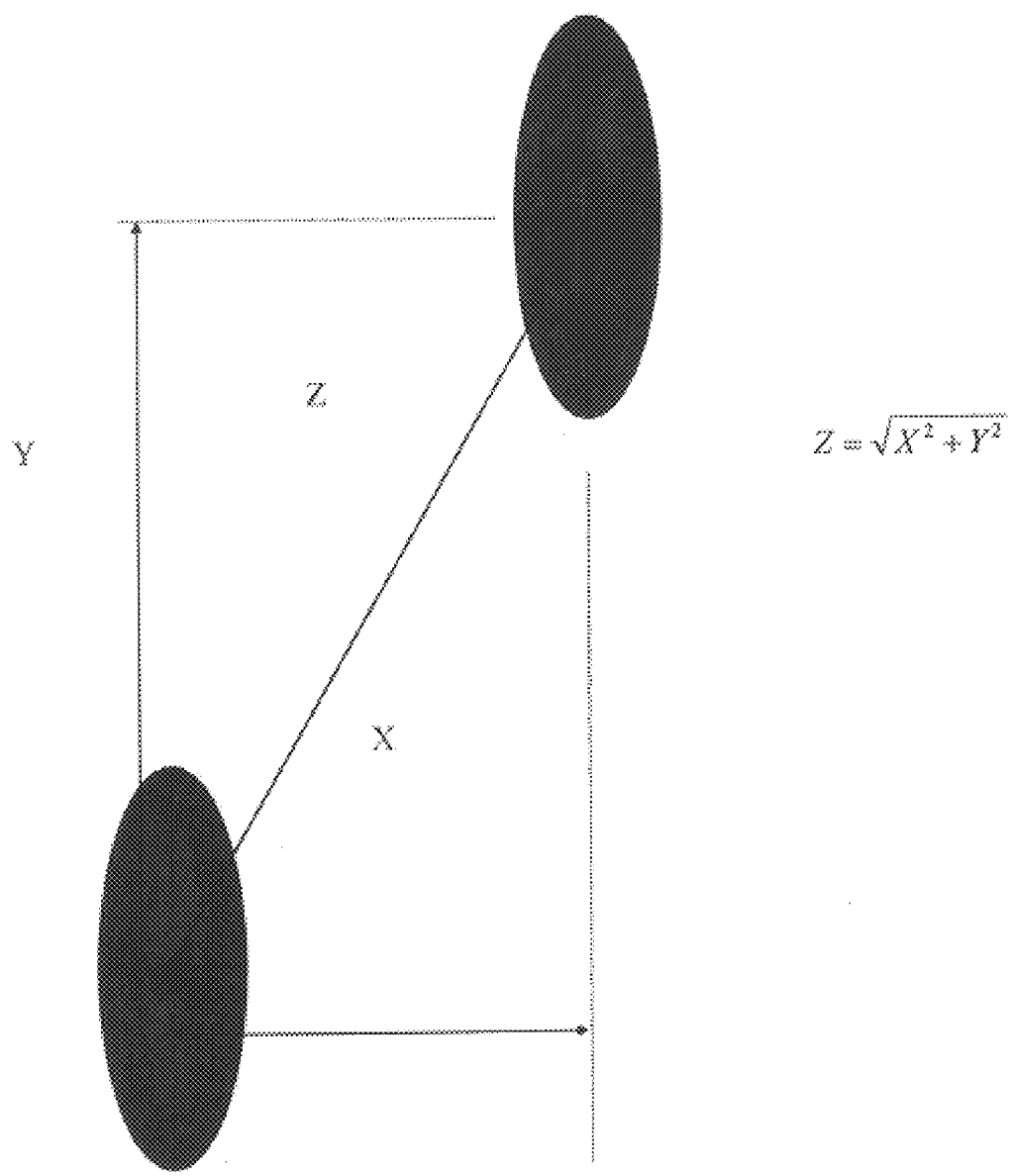
FIGS. 6 to 8 are simplified diagrams of illustrations of experiments according to embodiments of the present invention

Our goal has been to optimize overlap of the fiber centers with the nominal values to determine the true tolerances and to determine whether they meet our design specifications. We recall that that the distance from the point to point is different than in X and Y, as shown in FIG. 6. So the error calculated from point to point uses the radial distance Z for proper tolerance. Doing this, the statistical errors calculated from the data above are presented in Table-2. To minimize the total error between the two arrays we performed a three-step iterative mathematical process. The steps of the process includes:

1.) Shift the matrix so the origin is the center of the array (e.g., rotate about the center)

2.) Perform a $\theta$ rotation of the entire data array in the XY plane by multiplying the n by 2 matrix by the $[R_z]$ matrix:

$$[R_z] = \begin{bmatrix} \cos\theta & -\sin\theta \\ \sin\theta & \cos\theta \end{bmatrix}$$

3.) X-shift by adding a value to all the X-values of the array.

4.) Y-shift by adding a value to all the Y-values of the array.

5.) Measure the total error of the entire array.

6.) Iterate $\theta$, X-shift, and Y-shift, and measure error.

7.) Minimum error data tells you which combination of $\theta$, X-shift, and Y-shift gives the best matrix overlap.

This minimization has been performed on the 3×3 matrix presented in Table-1. The optimized matrix is presented in Table-2. The matrix manipulation determined that for the data to be optimized a $\theta$ rotation of +1.4580°, an x-shift of −0.0175 and a y-shift of −0.0015 was necessary to get the best overlap of the data matrix to the nominal matrix. These are analogous to the actual manipulation that would need to be performed on the bundle to properly align it to the perfect array. In reality, a characterized fiber bundle and characterized lens array will need to be properly overlapped. This is performed by reducing error between the two data matrices. Table-3, immediately following Table-2, shows the error comparison before and after matrix minimization.

Optimized Matrix

| | |
|---|---|
| 0.035248 | 0.053092 |
| −0.08466 | 1.030357 |
| 0.018531 | 1.928274 |
| 0.994865 | −0.03752 |
| 1.012439 | 1.001263 |
| 1.03486 | 2.046171 |
| 2.061257 | −0.03939 |
| 1.924391 | 0.975458 |
| 2.005258 | 2.042861 |

TABLE 2

| | Error of pure Data | | | Error of Optimized Data | | |
|---|---|---|---|---|---|---|
| Position | X-error | Y-error | Z-error | X-error | Y-error | Z-error |
| 1 | −0.0290 | −0.0790 | 0.0842 | −0.0352 | −0.0531 | 0.0637 |
| 2 | 0.0660 | −0.0590 | 0.0885 | 0.0847 | −0.0304 | 0.0899 |
| 3 | −0.0600 | 0.0460 | 0.0756 | −0.0185 | 0.0717 | 0.0741 |
| 4 | 0.0140 | 0.0360 | 0.0386 | 0.0051 | 0.0375 | 0.0379 |
| 5 | −0.0300 | −0.0020 | 0.0301 | −0.0124 | −0.0013 | 0.0125 |
| 6 | −0.0790 | −0.0460 | 0.0914 | −0.0349 | −0.0462 | 0.0579 |
| 7 | −0.0520 | 0.0650 | 0.0832 | −0.0613 | 0.0394 | 0.0728 |
| 8 | 0.0590 | 0.0470 | 0.0754 | 0.0756 | 0.0245 | 0.0795 |
| 9 | −0.0490 | −0.0180 | 0.0522 | −0.0053 | −0.0429 | 0.0432 |

TABLE 3

| | | | | | | |
|---|---|---|---|---|---|---|
| AVG | −0.0178 | −0.0011 | 0.0688 | −0.0002 | −0.0001 | 0.0591 |
| STD | 0.0523 | 0.0524 | 0.0227 | 0.0496 | 0.0453 | 0.0242 |
| MAX | 0.0660 | 0.0650 | 0.0914 | 0.0847 | 0.0717 | 0.0899 |
| MIN | −0.0790 | −0.0790 | 0.0301 | −0.0613 | −0.0531 | 0.0125 |

Figure 7:
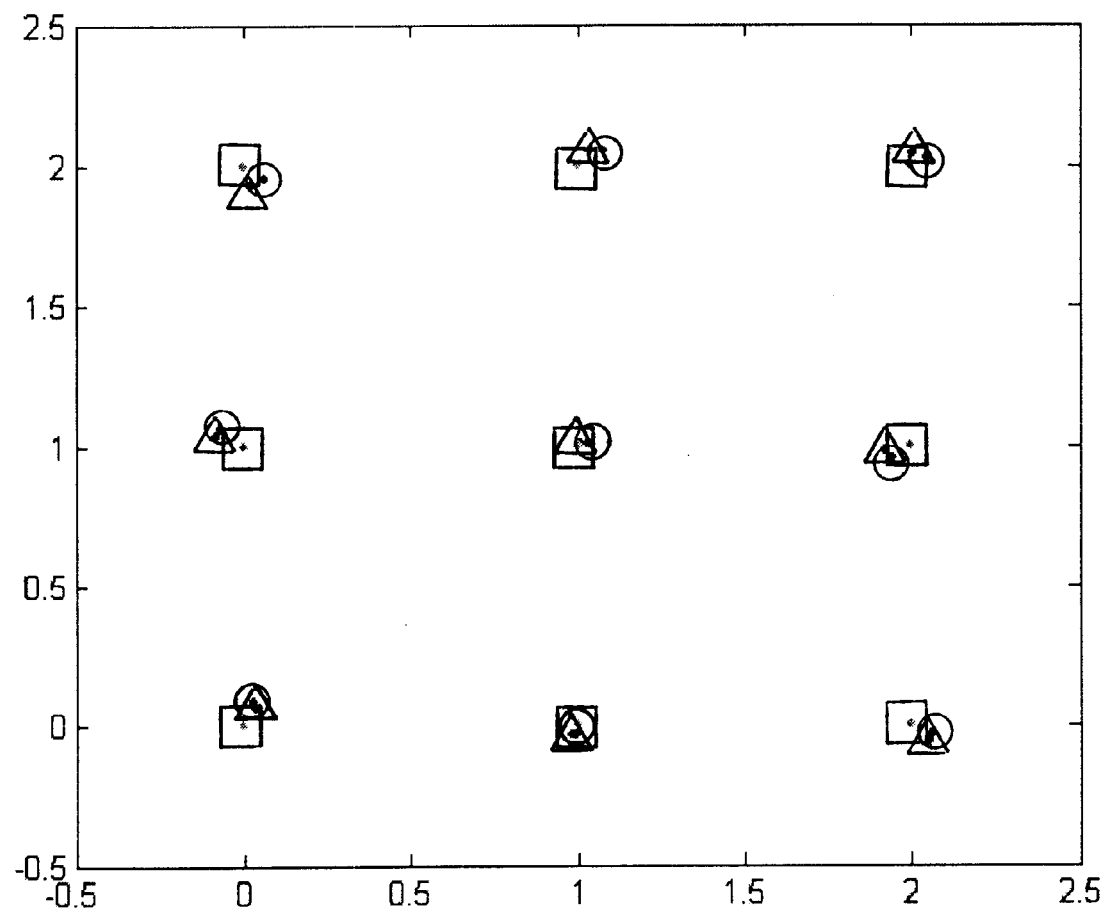
Figure 8:
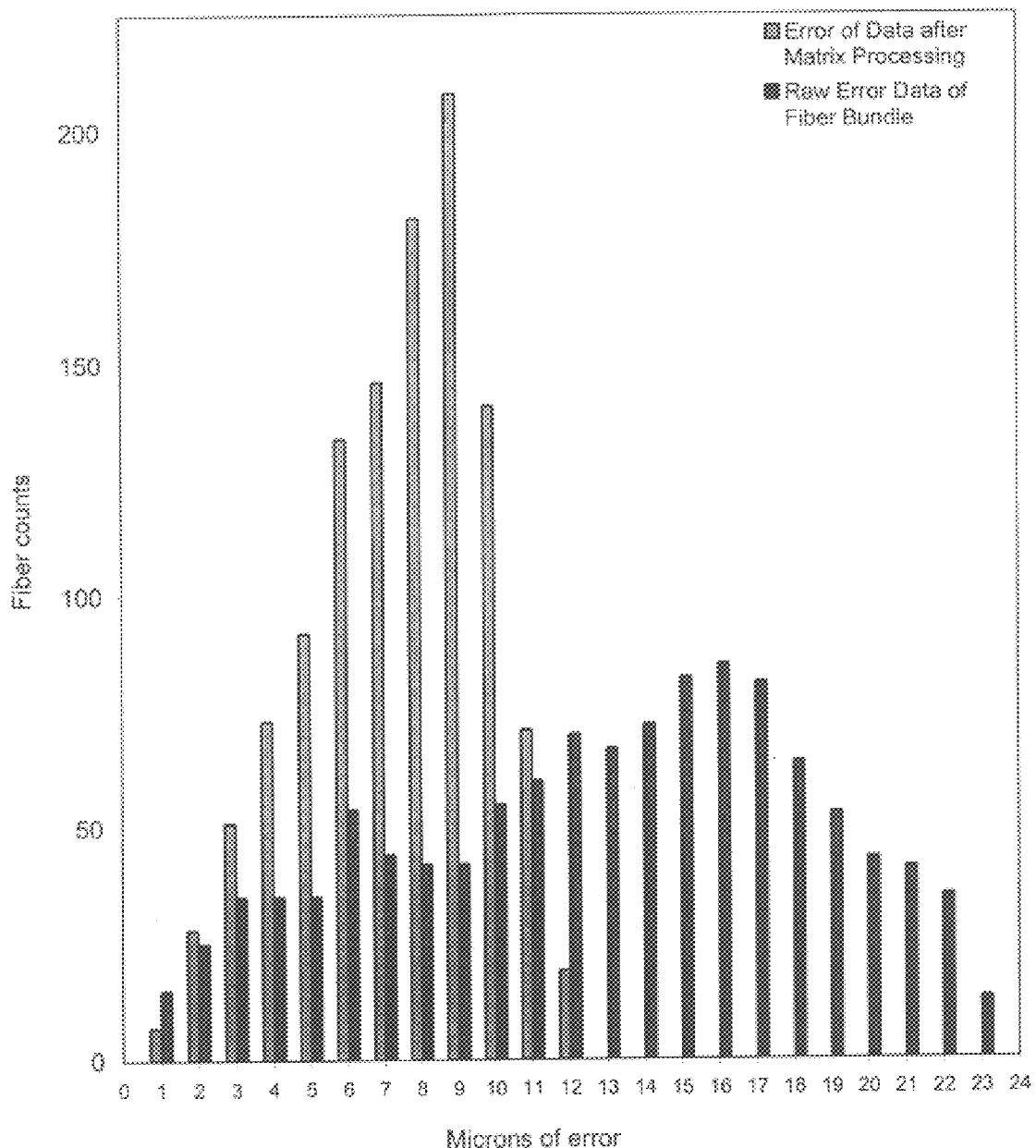

The error analysis presents a pretty clear picture of the improvement over standard techniques. For example, FIG. 7 shows a plot of the raw data (e.g., square), the optimized data (e.g., triangle), and the nominal values (e.g., circle). A benefit of this technique is not as clearly seen on such a coarse scale as presented in the 3×3 example. On an 1152 fiber array the same technique was employed and the error analysis of the data is presented in Table-4. A degree of improvement is more clearly seen when comparing the histogram of the raw data error and the optimized data error, which is shown in FIG. 8.

TABLE 4

| Error for all raw data | | | | Error for all optimized data | | | |
|---|---|---|---|---|---|---|---|
| xerror | yerror | radial | | xerror | yerror | radial | |
| 0.01036 | −0.00334 | 0.01231 | AVG | 0.00037 | 0.00066 | 0.00691 | |
| 0.00588 | 0.00545 | 0.00557 | STD | 0.00526 | 0.00503 | 0.00238 | |
| 0.02287 | 0.00684 | 0.02350 | MAX | 0.01030 | 0.00990 | 0.01195 | |
| −0.00252 | −0.01563 | 0.00006 | MIN | −0.01010 | −0.00900 | 0.00067 | |

This technique is critical in optimizing the proper overlap of any array of points to another array. Table-4 and FIG. 3 speaks for themselves, in that they show that the overall average error dropped and brought the distribution closer to the nominal values. This insures better overlap of the fibers to the lenses in their respective arrays, thereby assuring better coupling and less overall loss.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for manufacturing an optical switching device, the method comprising:
    forming an array plate comprising at least one hundred sites from a first physical process, each of the sites to be coupled to an optical fiber, the sites having a first spatial degree of error relative to a perfect mathematical grid of the sites, the first spatial degree of error being derived from at least the first physical process;
    deriving site measurement values from each of the sites and transferring site measurement values for each of the sites into a memory location;
    forming a lens plate comprising a plurality of lenses from a second physical process, each of the lenses to be coupled to at least one of the sites on the array plate, the plurality of lenses having a second spatial degree of error relative to a second perfect mathematical grid of lenses, the second spatial degree of error being derived from at least the second physical process;
    deriving lens measurement values from each of the plurality of lenses and transferring the lens measurement values for each of the sites into the memory location;
    comparing each of the site measurement values with its respective lens measurement value to determine an error measurement between the lens measurement values and the respective site measurement values at a first reference point;
    shifting the site measurement values relative to the lens measurement values by a selected increment relative to the first reference point, the selected increment being either an x-direction, a y-direction, or a theta direction;
    repeating the comparing to derive an other error measurement after the site measurement values have been shifted and continuing to perform the comparing and shifting in an iterative manner to reduce the error measurement between the site measurement values with its respective lens measurement values;
    determining a minimum error measurement based upon the repeated comparing and shifting, the minimum error measurement being relative to the first reference point; and
    coupling the array plate with the plurality of lenses by aligning the array plate to the plurality of lenses such that the site measurement values and the lens measurement values are arranged in a manner where the error measurement is at the minimum error measurement.

2. The method of claim 1 wherein the first mathematical grid of lenses and the second mathematical grid of array are the same.

3. The method of claim 1 where the minimum error measurement is less than five microns.

4. The method of claim 1 wherein the memory is provided in a computing device.

5. The method of claim 1 wherein the first spatial degree of error is less than eight micron.

6. The method of claim 1 wherein the array plate is made of a silicon bearing material.

7. The method of claim 1 wherein plurality of lenses is made of a silicon dioxide bearing material.

8. The method of claim 1 wherein the array plate and the plurality of lenses are made of a material that is substantially the same thermal expansivity.

9. The method of claim 1 wherein the deriving, comparing, shifting repeating, and determining are provided on a computing device.

10. The method of claim 1 wherein the coupling mechanically couples the plurality of lenses to the array plate.

* * * * *